United States Patent
Wolanin et al.

Patent Number: 5,246,250
Date of Patent: Sep. 21, 1993

[54] AIR BAG VALVE ASSEMBLY

[75] Inventors: Michael J. Wolanin, Hartland; Laura C. Stevenson, Ann Arbor; David E. Pettigrove, Brighton, all of Mich.

[73] Assignee: General Motors Corporation, Detroit, Mich.

[21] Appl. No.: 981,336

[22] Filed: Nov. 25, 1992

[51] Int. Cl.$^5$ ............................................ B60R 21/30
[52] U.S. Cl. .................................. 280/739; 280/736; 280/742; 280/743; 251/294
[58] Field of Search .............. 280/738, 739, 728, 736, 280/742, 743, 743 A; 251/294, 145; 137/601; 244/118.5, 121

[56] References Cited

U.S. PATENT DOCUMENTS

| | | | |
|---|---|---|---|
| 3,527,475 | 9/1970 | Carey et al. | 280/739 |
| 3,573,885 | 4/1971 | Brawn et al. | 280/150 |
| 3,642,303 | 2/1972 | Irish et al. | 280/150 |
| 3,879,057 | 4/1975 | Kawashima et al. | 280/743 A |
| 3,944,249 | 3/1976 | Smith et al. | 280/742 |
| 4,097,065 | 6/1978 | Okada et al. | 280/739 |
| 4,262,931 | 4/1981 | Strasser et al. | 280/729 |
| 4,360,223 | 11/1982 | Kirchoff | 280/729 |
| 4,500,114 | 2/1985 | Grey, Jr. | 280/742 |
| 4,805,930 | 2/1989 | Takada | 280/739 |
| 4,907,616 | 3/1990 | Shirdavani | 251/294 |
| 5,007,662 | 4/1991 | Abramczyk et al. | 280/739 |
| 5,016,913 | 5/1991 | Nakajima et al. | 280/738 |
| 5,020,567 | 6/1991 | Prouly | 251/294 |
| 5,044,663 | 9/1991 | Seizert | 280/730 |

*Primary Examiner*—Margaret A. Focarino
*Assistant Examiner*—Christopher P. Ellis
*Attorney, Agent, or Firm*—Charles E. Leahy

[57] ABSTRACT

An air bag valve assembly for installation in an opening in the fabric wall of an air bag includes first and second housing panels of flexible sheet material which overlie one another and are permeable to pass gas therethrough. The edge portions of the housing panels are stitched together to form a housing envelope in which a valve flap panel of flexible sheet material is supported. A tether is attached to the valve flap panel to move the valve flap panel across the gas permeable first and second panels when the tether is actuated. The valve assembly may be normally closed by using a gas impermeable material for the valve flap panel. Alternatively, the valve assembly may be normally open and then the actuation of the tether pulls a gas impermeable valve flap across the gas permeable first and second panels to block the flow of gas. The housing panels may be of a gas impermeable fabric having holes cut therein, or the panels may be an open weave mesh construction to pass gas therethrough.

9 Claims, 5 Drawing Sheets ic # AIR BAG VALVE ASSEMBLY

The invention relates to a vehicle air bag and more particularly provides a valve assembly for installation in a wall of the air bag to control the flow of air bag inflation gas.

BACKGROUND OF THE INVENTION

It is well known to provide an inflatable air bag for restraining a vehicle occupant. The air bag assembly includes a folded bag which is connected to a source of inflation gas. Release of the inflation gas into the air bag causes the bag to expand rapidly so that a face wall of the air is displaced toward contact with the occupant. It is well known to provide one or more vent openings in the walls of the air bag to vent inflation gas from the interior of the air bag into the occupant compartment. These air bag vents are commonly provided in a base wall portion of the air bag to direct the vented gas away from the occupant. In addition, it is well known to employ various flow control devices to control the flow of inflation gas through the vent opening.

The present invention provides a new and improved air bag valve assembly for an air bag.

SUMMARY OF THE INVENTION

An air bag valve assembly for installation in an opening in the fabric wall of an air bag includes first and second valve housing panels or strips of flexible sheet material which overlie one another and are permeable to pass gas therethrough. The edge portions of the housing panels are stitched together to form a housing envelope in which a valve flap panel of flexible sheet material is supported. A tether is attached to the valve flap panel to move the valve flap panel across the gas permeable first and second panels when the tether is actuated. The valve assembly may be normally closed by using a gas impermeable material for the valve flap panel. Alternatively, the valve assembly may be normally open and then the actuation of the tether pulls a gas impermeable valve flap panel across the gas permeable first and second panels to block the flow of gas. The housing panels may be of a gas impermeable fabric having holes cut therein, or the panels may be an open weave mesh construction to pass gas therethrough.

Accordingly, the object, feature, and advantage of the invention resides in the provision of a new and improved valve assembly for an air bag and more particularly a valve assembly which is operated between positions in response to the degree of displacement of the air bag from the stored position to the inflated position.

A further feature, object, and advantage of the invention resides in the provision of an air bag control valve assembly which is readily sewn into an opening provided in the air bag wall.

A further, object, feature and advantage resides in the provision of a valve assembly comprised of a flexible sheet valve flap interposed between inner and outer housing strips of gas permeable flexible sheet material so that the housing strips may be sewn into an opening in the air bag fabric and guidably mount the valve flap for movement with respect to the gas permeable housing strips to selectively open and close the gas flow.

A further object, feature, and advantage resides in the provision a movable valve flap associated with an opening in an air bag fabric and having a tether associated therewith for pulling the valve flap across the air bag opening in response to the degree of displacement of the air bag to the fully inflated position.

BRIEF DESCRIPTION OF THE DRAWINGS

These and other features, objects and advantages of the invention will become apparent upon consideration of the description of the preferred embodiment of the invention and the appended drawings in which.

DESCRIPTION OF THE PREFERRED EMBODIMENT

Figure 1:
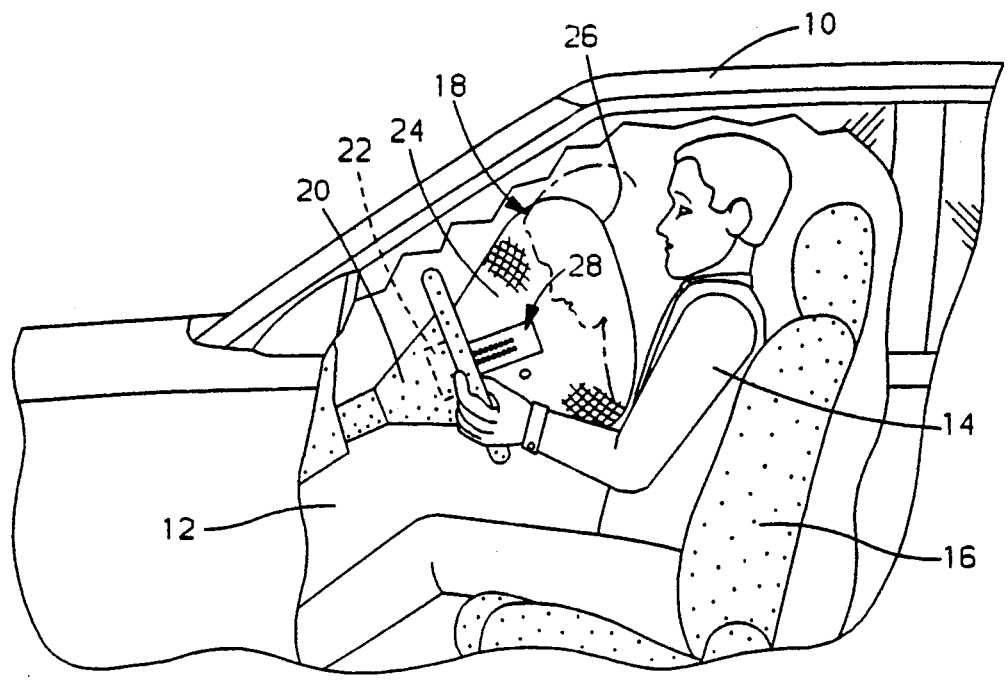
FIG. 1 is a side elevation view of an occupant compartment showing an air bag having the valve assembly of this invention mounted on a steering wheel.

FIG. 1 shows a motor vehicle 10 having an occupant compartment 12 in which occupant 14 is seated in seat 16. An air bag 18 of flexible fabric is mounted on the steering column 20 and receives inflation gas from an inflator 22. The air bag 18 includes a base wall portion 24 attached to the steering wheel and a face panel 26 for contact with the occupant 14, and which cooperate to define a chamber 27 within the air bag 18. FIG. 1 also shows that the air bag 18 has a vent 28 provided in the base wall portion 24, it being understood that another vent 29 is located on the opposite side of the air bag 18. Each vent has an associated closure valve.

Figure 2:
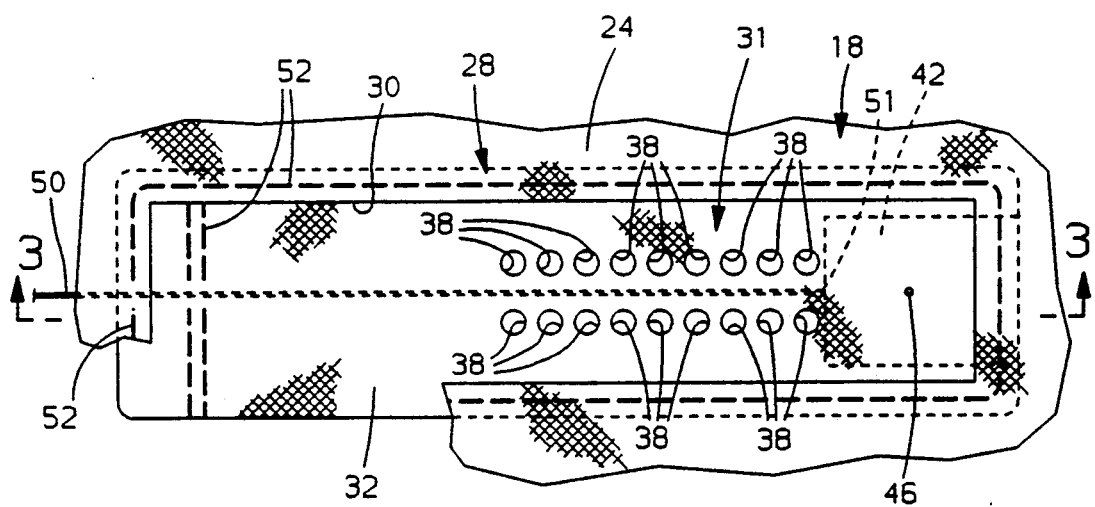
FIG. 2 is an enlarged fragmentary view showing the valve assembly.
Figure 3:
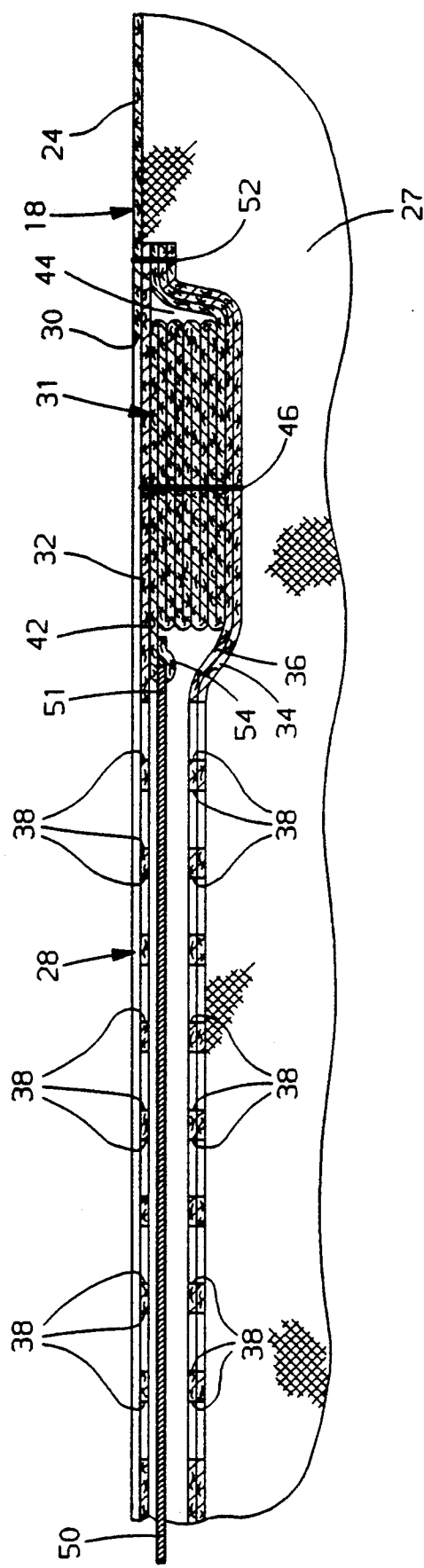
FIG. 3 is a sectional view taken in the direction of arrows 3—3 of FIG. 2 and showing further details of construction of the air bag valve assembly, including the gas permeable housing panels, the valve flap, and the tether for closing the valve flap across the valve openings of the housing panels.

FIGS. 2 and 3 show the construction of the vent 28 and its closure valve assembly. The air bag base wall portion 24 has a long slot 30, cut therefrom. A vent valve assembly, generally indicated at 31, is constructed of a valve housing defined by an outer panel or strip 32 and two inner panels or strips 34 and 36 which overlie one another and have a plurality of small vent holes 38 cut therein. A valve flap 42 is interposed within the housing envelope defined between the outer strip 32 and the inner strips 34 and 36 and folded in a stack of accordion pleats stored within a storage pocket 44 as best shown in FIG. 3. The vent flap 42 is retained in this stacked condition by a stitch 46 which extends through the outer strip 32, the stacked valve flap 42 and the inner strips 34 and 36.

As seen in FIGS. 2 and 3, the outer dimensions of the vent valve assembly 31 are wider and longer than the dimension of the slot 30 in the air bag 18 so that the vent valve assembly 31 may be sewn to the air bag 18 by a row of stitches 52 which encircle the slot 30.

A tether wire 50 has an end 51 which is captured in a loop 54 sewn or glued at the end of the valve flap 42. As seen in FIG. 2, the tether 50 passes through the row of stitches 52 so that the tether wire 50 is guidably supported in the air bag 18.

Figure 4A:
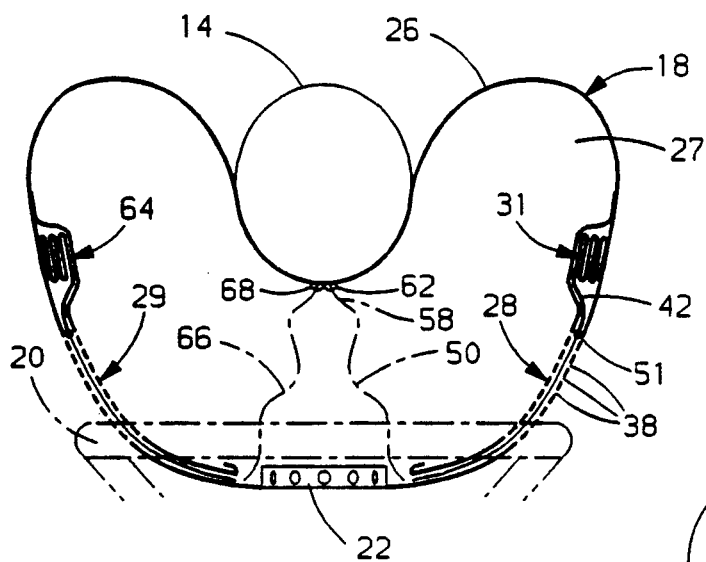
FIG. 4a is a schematic view showing an air bag deployment in which the air bag has obtained only a limited degree of displacement to the inflated position so that the vent operating tethers remain slackened and the vent openings remain open to vent inflation gas to the occupant compartment.
Figure 4B:
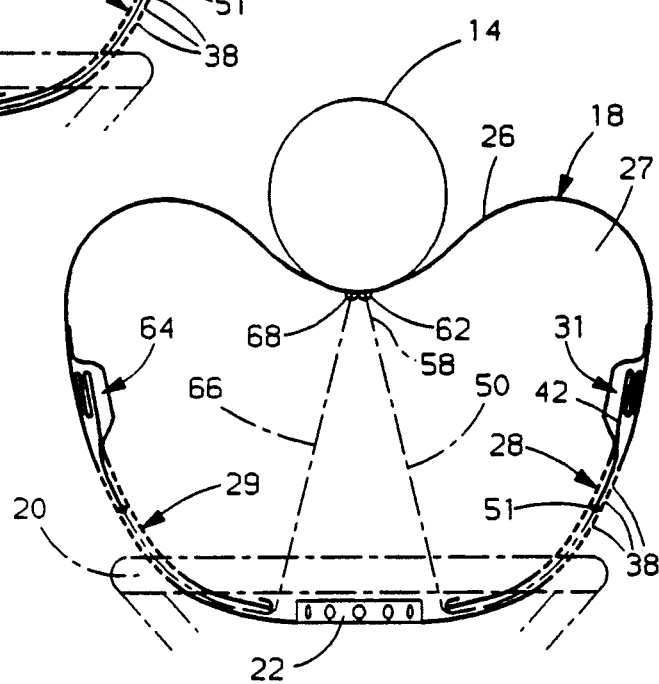
FIG. 4b is a view similar to 4a but showing the air bag inflated to a greater degree of air bag displacement so that the tethers are tensioned to begin closing the valve flaps over the vent openings.
Figure 4C:
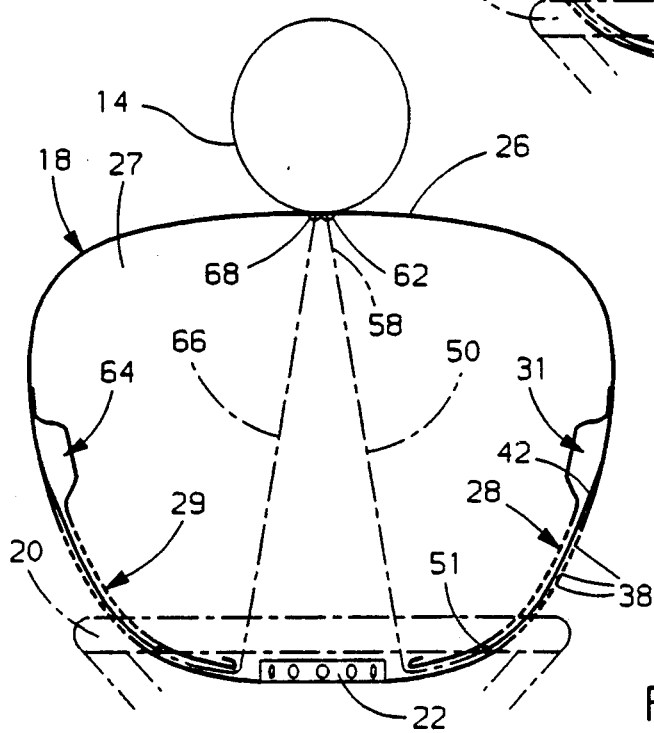
FIG. 4c is a view similar to 4a and 4b but showing a fully displaced air bag in which the tethers are tensioned and have pulled the valve flaps fully over the vent openings.

Referring to FIGS. 4a, 4b, and 4c, it is seen that the tether wire 50 has an end 58 which is suitably attached to the face panel 26 at a fabric loop 62 sewn to the face panel 26 on the inside surface thereof. FIG. 4a also shows that the vent 29 located on the opposite side of the air bag 18 from the vent 28 has a vent valve assembly 64 associated therewith which is identical to the vent valve assembly 31 The vent valve assembly 64 is operated by a tether wire 66 which is attached to the inside of the face panel 26 by a loop of fabric 68.

FIGS. 4a, 4b, and 4c schematically demonstrate three different air bag deployment conditions, it being understood that the air bag 18 is normally folded upon itself and concealed within a plastic container on the steering wheel until the introduction of inflation gas from the inflator 22 causes the air bag to burst from the container and begin displacement of the face panel 26 toward the occupant 14.

FIG. 4a shows a deployment condition in which the displacement of the face panel 26 is limited by the position of the occupant so that the tether wires 50 and 66 remain in a slackened condition which permit the vents 28 and 29 remain in the open condition shown in FIGS. 2 and 3.

FIG. 4b shows a different deployment condition in which the face panel 26 has obtained a further degree of displacement in which tether wires 50 and 66 and have become tensioned and the tether wire 50 has pulled the valve-flap 42 to sever the flap stitch 46 and permit the valve flap 42 to move partway across the vent openings 38 so that the aggregate size of the vent openings 38 is partially reduced.

FIG. 4c shows a deployment in which the face panel 26 is fully displaced upon full inflation of the air bag 18 so that the tether 50 has completely unfolded the flap 42 to completely close off the vent openings 38.

It will be appreciated that the use of the air bag vent arrangement disclosed herein permits, tuning of the air bag system to a wide range of desired performance characteristics. For example, the size, number, and spacing of the vent openings 38 may be varied. In addition, the material of the valve flap 42 can be chosen to be either a gas permeable or impermeable material.

It is also known that the displacement of the air bag 18 to the deployed condition routinely occurs at such speed that the displacement of the bag overtakes the pressure buildup provided by the inflator so that the gas pressure inside the bag is less than the ambient air pressure in the passenger compartment. Thus, although the vents are open during displacement, little or no gas may be actually vented position of FIG. 4c is accomplished with little or no venting, while the partial displacement to the position of FIG. 4a will leave the vent open during pressure buildup so that gas will be vented out of the air bag 18.

It will also be understood that the length of the tethers 50 and 66 may be selected of a length to limit the overall displacement of the air bag 18 so that these valve operating tethers will also function as travel limiting tethers for the air bag face wall 26.

Figure 5:
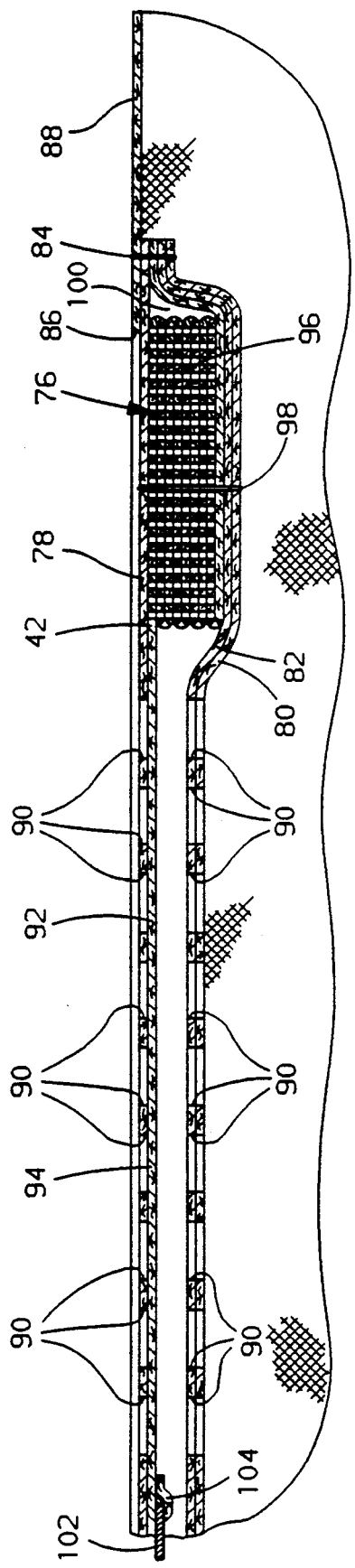
FIG. 5 is a view similar to FIG. 3 but shows a second embodiment of the valve assembly in a normally closed position.
Figure 6:
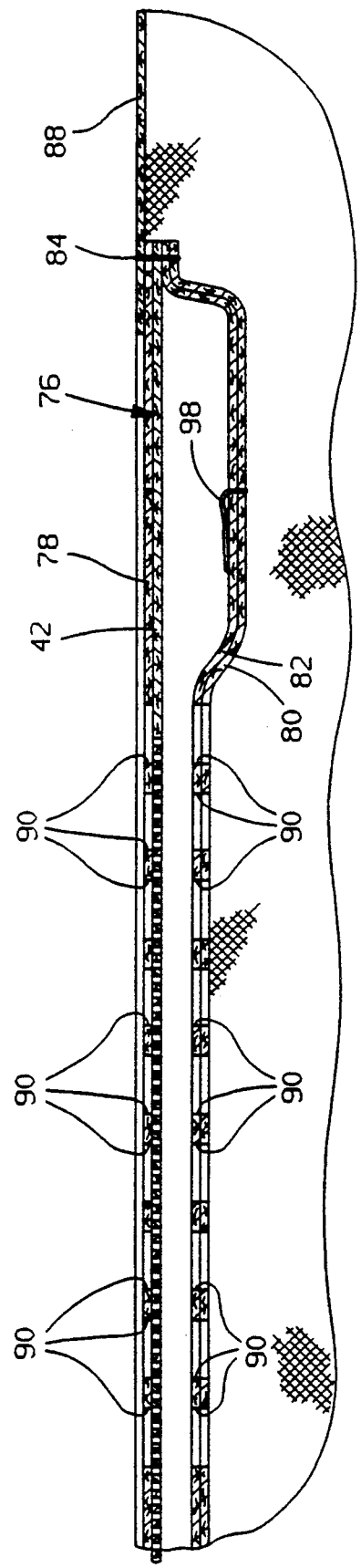
FIG. 6 shows the valve assembly of FIG. 5 moved to the opened position.

Referring to FIGS. 5 and 6 an alternative embodiment of the valve assembly is shown and designated 76. The valve assembly 76 includes a housing defined by an outer strip 78 and a pair of inner strips 80 and 82 stitched together around the edges thereof at 84 and overlying a slot 86 provided in the wall 88 of the air bag. The outer wall 78 and the inner walls 80 and 82 have a plurality of openings 90 punched or cut therein to provide a gas permeable structure through which gas may pass through the housing strips 78, 80 and 82. A valve flap 92 is captured between the housing strips 78 and. 80 and includes a gas impermeable portion 94 which registers with the openings 90 and a gas permeable portion 96 which is stacked and retained within storage pocket 100 by a stitch 98. The gas permeable portion 96 is provided by a loose weave fabric which provides an open mesh screen. The tether wire 102 is attached to the gas impermeable portion 94 at 104 and, when tensioned, pulls the gas impermeable portion 94 away from the openings 90 as shown in FIG. 6 so that the gas permeable portion 96 registers with the openings 92 to permit flow of gas through the air bag wall 88.

Figure 7:
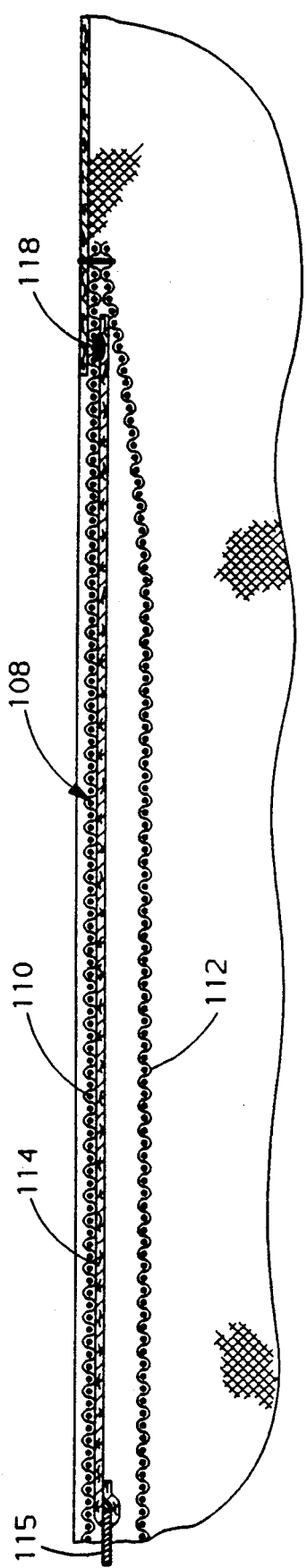
FIG. 7 shows yet another embodiment of the invention in a normally closed position.

FIG. 7 shows yet another embodiment of the invention in which a normally closed valve is provided. The valve assembly 108 includes an outer housing strip 110 and a single inner housing strip 112 which are provided by a loose weave open mesh screen fabric or plastic material to permit the flow of gas therethrough. A valve flap 114 of gas impermeable material is captured between the outer housing strip 110 and inner housing strip 112 to normally block the flow of gas through the valve assembly 108. However, when the tether wire 115 is tensioned, the moveable valve flap 114 is released by a bead of adhesive provided at 118 so that the moveable flap 114 may pulled away from its position of FIG. 7 covering the gas permeable housing strips 110 and 112. It will be understood that the left hand end of the housing strips 110 and 112 will separate as necessary to permit the moveable flap 112 to exit from the valve housing.

Figure 8:
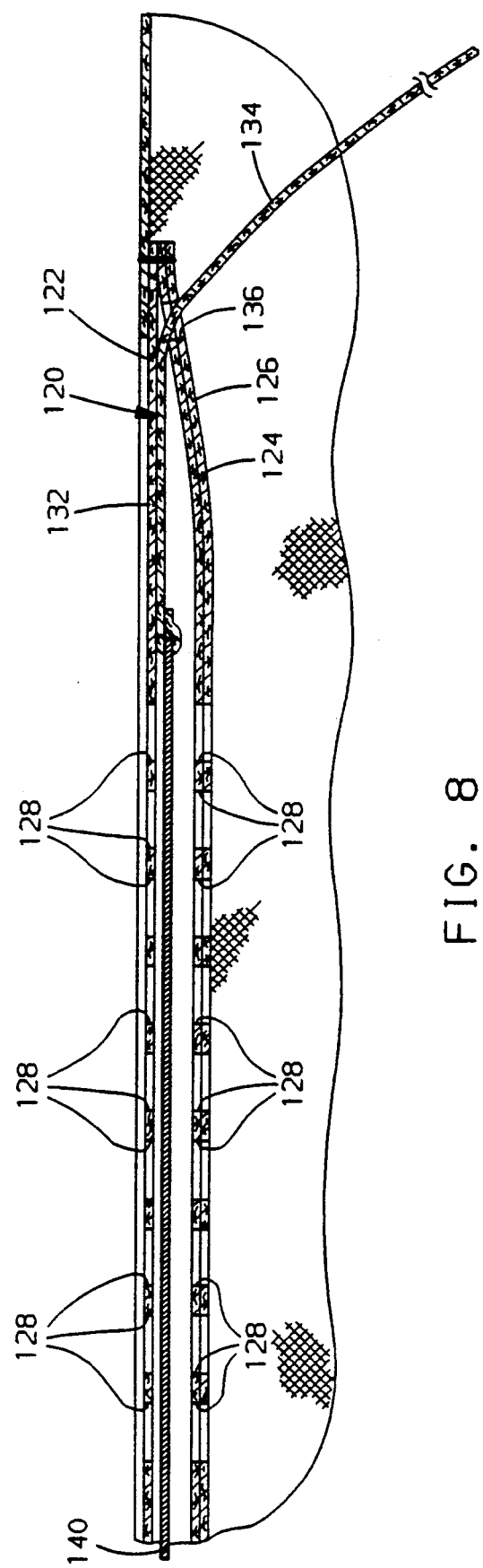
FIG. 8 shows yet another embodiment of the invention in a normally open position.

FIG. 8 shows yet another embodiment of the invention in which a valve assembly 120 is provided and shown in a normally open position. The valve assembly 120 includes an outer housing strip 122 and first and second inner housing strips 124 and 126 having gas flow openings 128 punched or cut therein to permit the flow of gas therethrough. A valve flap 132 of gas impermeable material is captured between the outer housing strip 122 and the inner housing strip 124 but has a normal position shown in FIG. 8 in which the gas flow openings 128 remain open. The valve flap 132 has a tail end 134 which extends through a slot 136 in the inner housing strips 124 and 126. When the tether wire 140 attached to the valve flap 132 is pulled, the valve flap 114 is pulled across the flow openings 128 to block gas flow through the openings, and the tail end 134 is pulled through the slot 136 so that the moveable flap 132 is progressively fed into the valve housing and disposed across the flow openings 128 as the tether wire 140 is pulled.

It will be understood that the FIGS. 3, 5, 6, 7, and 8 show the housing strips separated from one another for purposes of clarity, it being recognized that in an actual air bag construction these walls will be juxtaposed closely with one another, particularly when the air bag assembly is folded for storage in the pre-deployment condition.

Furthermore, it will be understood that although the air bag shown herein is a driver side air bag, the invention is also applicable to passenger air bags.

Thus is it seen that the invention provides a new and improved valve assembly for a vehicle air bag and which may be readily installed in a fabric wall of the air bag and operated between open and closed positions by a tether. The tether may be anchored on the air bag or on the inflator so that relative movement between the wall of the air bag which carries the valve assembly and the anchored end of the tether will operate the valve assembly. Although the drawings herein show the tether as a wire, the tether may be a nylon fabric strip and may be continuous one-piece construction with the valve flap. The valve assembly may be provided in either a normally opened or normally closed condition and the moveable valve member may be completely impermeable to gas flow to provide complete cut off of gas flow through the valve assembly, or the valve flap may be somewhat permeable to gas flow to permit any desired level of controlled flow through the valve flap even when the valve flap assembly is in the closed position. The valve assembly includes a housing defined by gas permeable members and a valve flap which slides between the housing panels between positions opening and closing the flow through the gas permeable housing panels. The housing panels may be sewn or otherwise suitably attached to the air bag wall to register with an opening provided by a slot or apertures cut in the air bag wall. The moveable flap can releasably anchored to the housing strips by a stitch, adhesive, or other suitable means, or the flap may be restrained in the normal position merely by the frictional contact between the valve elements. The gas permeable material may be either a tight knit fabric having holes cut therein, or a loosely weaved fabric leaving air flow passages between the threads thereof. Additional modifications may be made within the ordinary skill of the art and teachings of this specification and the claims appended hereto.

The embodiments of the invention in which an , exclusive property or privilege is claimed are defined as follows:

1. An air bag valve assembly for installation in an opening in a fabric wall of an air bag, comprising:
   first and second panels of flexible sheet material overlying one another and being permeable to pass gas therethrough and having edge portions joined together to form a housing envelope;
   a valve flap panel of flexible sheet material interposed between the first and second panels so that the valve flap panel is supported for movement across the first and second panels;
   and a tether having a first end operably associated with the valve flap panel and a second end operable to actuate the tether and move the valve flap across the gas permeable first and second panels.

2. The air bag valve assembly of claim 1 further characterized by the first and second panels being a fabric having holes cut therein.

3. The air bag valve assembly of claim 1 further characterized by the first and second panels being an open weave mesh to pass gas therethrough.

4. The air bag valve assembly of claim 1 further characterized by the valve flap panel having a gas impermeable portion normally supported across the first and second panels and being moved away by the tether to permit gas flow through the first and second gas permeable panels.

5. The air bag valve assembly of claim 1 further characterized by the valve flap panel having a gas permeable portion and a gas impermeable portion, with one portion normally disposed across the first and second panels of the housing envelope and the other portion being stored for subsequent movement across the first and second panels when the tether is operated.

6. The air bag valve assembly of claim 1 further characterized by the valve flap panel having a stored portion for movement across the first and second panels when the tether is operated.

7. The air bag valve assembly of claim 6 further characterized by the stored portion being stacked in a folded condition and stored in a storage pocket of the housing envelope.

8. The air bag valve assembly of claim 6 in which the stored portion extend through a slot provided in the housing envelope and is stored inside the air bag.

9. The air bag valve assembly of claim 7 having a releasable retainer acting between the valve flap panel and the housing envelope to retain the valve flap panel in the stored position and release the valve flap panel for movement when the tether is pulled.

* * * * *